Patented Feb. 12, 1952

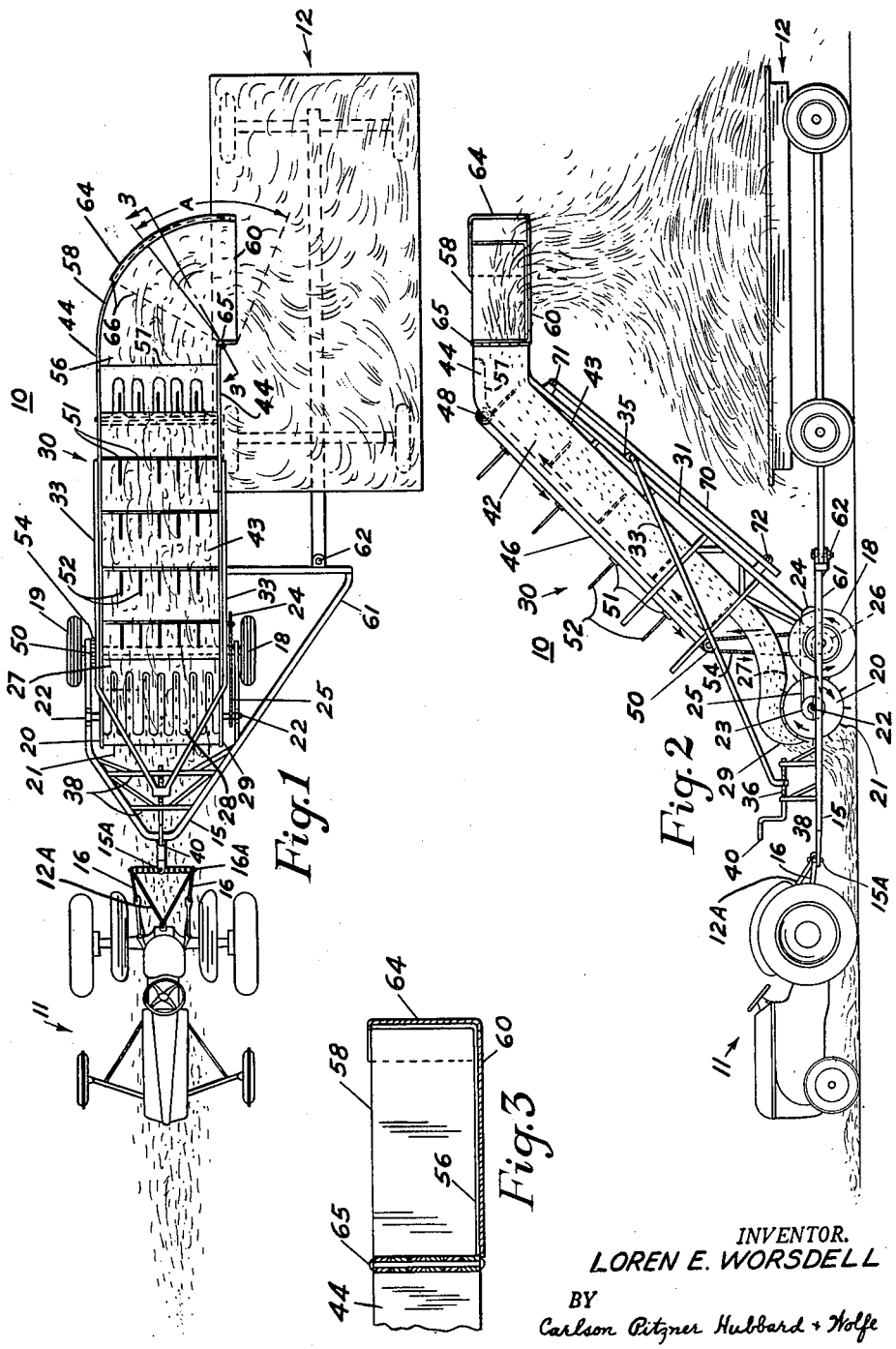

2,585,891

UNITED STATES PATENT OFFICE 2,585,891

HAY LOADER

Loren E. Worsdell, Vermont, Ill., assignor to Harry Ferguson, Inc., Detroit, Mich., a corporation of Delaware Application June 27, 1946, Serial No. 679,770

4 Claims. (Cl. 214—41)

The present invention relates to tractor drawn hay loaders.

In general, it is the aim of the present invention to provide a novel and improved hay loader of durable but inexpensive construction which accomplishes a smooth flowing loading of a wide variety of hay and similar materials with a minimum of manual labor entailed in arranging the hay on the wagon or rack being loaded.

More particularly, it is an object to provide a loader accommodating a wagon or the like trailed along beside the same in such manner that hay is delivered at or about the center of the wagon for easy distribution on it.

Further it is an object to provide such an arrangement in which provision is made for adjustably varying the angle of generally lateral discharge from the loader onto the wagon alongside it.

Moreover, it is an object to provide such a loader which is of a character to accommodate turning of the same from side to side with close trailing of the loader behind the tractor along the windrow but without interference with the accompanying wagon and without danger to a workman riding the load on the wagon.

Further objects and advantages of the invention will become apparent as the following description proceeds, taken in connection with the accompanying drawing, in which:

Figure 1 is a generally diagrammatic plan view of a hay loader, embodying the present invention, together with an associated tractor and hay receiving vehicle.

Fig. 2 is a view in elevation of the hay loader shown in Fig. 1.

Fig. 3 is an enlarged fragmentary section taken along line 3—3 of Fig. 1.

While the invention is susceptible of various modifications and alternative constructions, I have shown in the drawings and will herein describe in detail the preferred embodiment, but it is to be understood that I do not thereby intend to limit the invention to the specific forms disclosed, but intend to cover all modifications and alternative constructions falling within the spirit and scope of the invention as expressed in the appended claims.

Referring more particularly to the exemplary structure, a hay loader 10 embodying my invention is shown as being drawn by a Ford-Ferguson tractor 11 in position to discharge hay onto a vehicle or rack 12. The hay loader 10 includes a horizontal frame 15 having a forward portion bearing a clevis 15a by which it is detachably secured in trailed relation to drawbar 16a on a pair of draft links 16. These draft links are trailingly pivoted from the rear end of the tractor 11 and the links 16 are disabled against their usual vertical swinging movement, as by braces 12A, to counteract the rearwardly overhanging weight of the loader.

The frame 15 is borne by a pair of pneumatic tired ground wheels 18 located coaxially on opposite sides of the frame and at the rear portion thereof. In addition to serving as a support for the frame, the ground wheels also provide driven power to the hay pickup and elevating devices to be later detailed.

Mounted at the forward portion of the frame 15 and extending transversely with respect to the path of motion, is a hay pickup cylinder 20, on the periphery of which are mounted rows of radially extending pickup fingers or spikes 21. As shown more particularly in Fig. 2, the pickup cylinder is journaled in bearings 22 mounted in the frame at a level which will allow the fingers 21 normally to clear the earth by a small amount.

Provision is made for rotating the pickup cylinder 20 so that the top portion thereof moves in a direction away from the tractor, in other words, so that the pickup cylinder discharges rearwardly. In the present embodiment, power for driving the cylinder is applied to it from the ground engaging wheel 18 as follows: The cylinder 20 carries a sprocket 23 rigid therewith and which has an endless chain 25 trained over it. This chain is also trained over an idler sprocket 24, located rearwardly of the wheels, and over drive sprocket 26 which is driven by the ground wheel 18. Thus, upon forward movement of the hay loader, rotation of the wheel 18 produces clockwise rotation (as viewed in Fig. 2) of the cylinder 20.

Hay is received from the cylinder 20 upon a horizontal apron 27. Along the forward edge of the apron 27 are curved, forwardly extending fingers 28 which are positioned to lie between the hay engaging fingers or spikes 21 on the pickup cylinder. Upon rotation of the pickup cylinder, the fingers 28, with a cam-like action, pry the hay from the cylinder. This occurs gradually as the cylinder rotates, and by the time disengagement from the cylinder is complete, the hay is lodged on the apron 27. At the lateral edges of the apron 27 are guards or side walls 29 which extend forwardly, generally following the contour of the pickup cylinder and serving to prevent loss of the hay.

Elevation and discharge of the hay after it is deposited on the apron 27 is effected by an elevator indicated generally at 30. Such elevator extends upwardly and rearwardly from the apron 27, being supported in such position on a frame 31. Mounted on the elevator frame 31 is an elevator chute 42 which is formed of an inclined hay supporting surface or floor 43, forming a substantially uninterrupted extension of the apron 27, together with side walls 44 joined to the outer edge of the floor.

The hay is pulled uniformly up the chute 42 by means of an endless chain elevating mechanism. Endless chains 46, one on each side of the chute, are trained over sprockets 48 and 50 supported on transverse shafts at the upper and lower ends respectively of the side walls 44. The endless chains at spaced intervals carry cross members 51, each of the latter being provided with a plurality of outwardly extending fingers 52. These fingers are of sufficient length to extend downwardly into the hay on the inclined surface 43 without actually touching the floor surface. The floor 43 may be smooth to allow advancement of the hay with a minimum of friction and agitation or alternatively may be roughened somewhat, as by transverse corrugations, to prevent any tendency for the hay to slide backwardly. Hay is removed from the fingers 52 by the stripper plate 57.

Elevating movement of the endless chains (in a counterclockwise direction as viewed in Fig. 2) is produced by rotation of a driving sprocket chain 54 which is trained over the sprocket 50 which drives the endless chains and also over a sprocket (not shown) similar to sprocket 26 but preferably located on the opposite side of the machine. Forward movement of the loader, therefore, causes the hay engaging fingers 52 to successively come into contact with the hay, urging it upwardly along the surface 43 toward the top of the elevator structure.

The elevation of the entire elevator structure 30 can be adjusted in angular position about a horizontal axis on the rearmost portion of the frame 15. In the present instance this is accomplished by a supporting yoke 33 which extends upwardly and rearwardly from the frame 15 and around the sides of the elevator to engage the elevator frame at pivots 35. The lower end of the yoke 33 is adjustably positioned by being threaded to a longitudinal screw 36 mounted on brackets 38. Rotation of the screw 36 effected by an attached crank 40 in one direction or the other, causes the lower end of the yoke 33 to be advanced or moved backwardly producing a raising or lowering of the elevator frame.

At the top of the elevator structure novel and improved means are provided for discharging the hay laterally of the hay loader. The means used for accomplishing such lateral discharge is a horizontal side-discharging skidway conveniently referred to as a discharge elbow. Such elbow includes a bottom surface 56 which is sector-like in form (see Fig. 1) and which is a smooth continuation of the inclined elevator floor 43. An arcuate wall indicated generally at 58, which is substantially perpendicular to the outer edge of the surface 56 serves to guide the elevated hay through an angle of approximately ninety degrees. The interior surface of the wall 58 is preferably smooth and without obstruction so that the layer of hay moved to the top of the elevator continues to move uninterruptedly until discharged laterally of the loader, such discharge taking place from a terminal edge or mouth 60 of the surface 56. Although no power driven means are used for forcing the hay along surface 56, it has been found in practice that the pressure of the hay just emerging from the top of the inclined surface 43 is sufficient to cause the hay on surface 56 to be uninterruptedly discharged.

In the preferred embodiment illustrated the discharge elbow is provided with a pivoted spout 64 mounted on a hinge 65 (Fig. 3) for movement about a vertical axis through an angle A. The pivoted spout carries an overlapping portion 66 which enables the spout to be rotated forwardly through a considerable angle without affecting the continuity of the discharge elbow as a whole.

The use of a pivoted spout as disclosed is accompanied by several advantages of great practical importance. In the first place a farm hand on the accompanying wagon 12 may be extending or retracting the spout 64 directing the discharge to the forward section or rearmost section of the wagon to facilitate spreading and proper loading of the hay. He may also compensate for the relative approach or separation of the loader and wagon which will occur on turns. A further advantage is that as the elevator swings inwardly of the wagon during a sharp right turn, retraction of the spout greatly increases the clearance to a farm hand on the wagon thereby avoiding possible injury to him.

In order to maintain the vehicle 12 in the proper position for discharging hay into the central portion thereof while still enabling turns to be negotiated, means are provided for applying draft force to the vehicle at a point ot the side of the loader and at the rear portion of the frame 15. This is accomplished by a generally triangular bracket 61 which extends laterally of the frame 15 and which carries at its trailing edge an offset hitch connection 62. If desired, the bracket 61 may be made integral with the frame 15; in any event, it is desirable that the hitch structure produce a line of draft to the vehicle 12 which is as direct as possible (see Fig. 1).

Another important advantage of hitching the vehicle as shown may be appreciated by reference to Fig. 2 which shows the relation of the vehicle to the rearwardly inclined and overhanging elevator frame. As the tractor makes a sharp right turn, frequently required in following a windrow, the elevator will tend to swing in a clockwise direction. This might be expected to cause a lateral collision between the two structures and, as a matter of fact, it is for this reason that side-by-side hitching is usually avoided. In the present instance, however, the overhanging nature of the elevator allows the vehicle to swing inwardly below it without lateral interference.

Not only does the means for hitching the vehicle enable satisfactory turning, but the arrangement of the pickup mechanism itself is well adapted for negotiating turns with undiminished efficiency. It will be noted that the pick-up cylinder 20 very closely follows the rear wheels of the tractor. Thus, offset between the path of movement between the tractor wheels and the path of movement of the pick-up cylinder is reduced to a minimum, and substantially all the hay which passes between the tractor wheels is retrieved by the cylinder, even under conditions requiring a sharp turn of the tractor to the right or to the left. In the case of the conventional pull-behind hay loader, on the other hand, it is necessary to drive the tractor and vehicle straight forward over the windrow at the corner and then turn back sharply so that the tractor and vehicle together again straddle the windrow. Even with this maneuvering the conventional hay loader frequently fails to follow the windrow at the corners and portions of the windrow are left in the field. As a corollary but none the less important result of such close tracking between the pick-up cylinder and the tractor, the cylinder and loader may be constructed of minimum width without sacrificing any effectiveness in the pick-up operation.

Using the hay loader as described above, it is possible for a crew consisting solely of the tractor operator to operate the entire apparatus. This is particularly feasible because of the discharge of hay into the center of the receiving vehicle rather than at one end as is common practice, such central loading enabling a loose load to be obtained without manual spreading or distribution. Under such circumstances it is desirable, of course, to use a vehicle having relatively high side boards.

Operation by a single individual is further made possible because all the functions of the device are readily viewed from the tractor. Thus the operator of the tractor may at all times observe whether the pick-up cylinder is operating efficiently, whether the elevator mechanism is properly receiving the hay picked up by the cylinder, and whether the hay is being discharged at the desired rate from the discharge elbow. This structure may, therefore, be contrasted with hay loaders in which the pick-up cylinder is trailingly mounted out of sight of the operator of the tractor.

Although the operation of the device will be apparent from the foregoing description, such operation may be briefly summerized as follows: As the tractor is guided down the field straddling a windrow, the hay in such windrow is elevated from the ground by the outwardly extending fingers 21 of the cylinder 20. As the hay reaches the top of the cylinder, it is disengaged from the moving fingers 21 by means of stationary fingers 28 projecting between the rows of fingers 21. The hay is thereby gradually disengaged from the moving fingers and is deposited on the horizontal apron 27.

Upon reaching the inclined surface 43, the hay is engaged by the downwardly extending fingers 52 of the elevator mechanism and urged upwardly until deposited on the horizontal surface 56 at the upper end of the elevator. At this point the hay is deflected laterally by the curved side wall 58, being discharged into the center of the vehicle 12 traveling alongside. If desired, an operator riding upon the hay receiving wagon 12 may adjust the movable spout 64 of the discharge elbow to deposit the hay at a selected point on the vehicle.

It will be noted that during this operation the hay is lifted gently and with a minimum of mechanical agitation all the way from the ground to the discharge mouth of the loader. It is also to be noted that the hay which is picked up need not be bent around the pick-up cylinder through an acute angle as is necessary in the case of conventional pull-behind loaders. On the contrary, because of the gradual turns through which the material is deflected and because of the uninterrupted nature of the floor surface, the fibrous structure of the window may be kept substantially intact up to the time of discharge and the leaf loss reduced to a minimum.

When the hay loader is uncoupled from the tractor a support is provided for the overhanging weight of the elevator. In the present instance this is accomplished by supporting legs 70 pivotally connected to the upper portion of the elevator on brackets 71. Such legs may be rigidly mounted on a common transverse shaft for movement together. Any desired type of retaining means, for example a catch 72, may be used to hold the supports 70 in the infolded position shown when not in use. When it is desired to use the supports 70 it is merely necessary to swing them downwardly for engagement with the ground as the rear end of the loader settles when it is uncoupled from the tractor.

I claim as my invention:

1. In a tractor-drawn hay loader, the combination of a wheel supported frame bearing an upwardly and rearwardly inclined elevator overhanging the rear end of said frame with an unobstructed space between such overhang, means for trailingly hitching said frame to the rear end of a tractor for free lateral swing with reference thereto, means for detachably connecting a vehicle to said frame to trail alongside the rear portion of said elevator with free lateral swing with reference thereto, the upper end of said elevator extending substantially to the midpoint of the vehicle, the lower end of said elevator being sufficiently far forward to enable the vehicle to swing under the overhang of said elevator without lateral interference, and a sector shaped skidway at the upper end of said elevator for directing hay emerging therefrom laterally onto the vehicle trailed alongside.

2. In a tractor-drawn hay loader, the combination of a two-wheeled supporting frame, an elevator on said frame upwardly and rearwardly inclined and arranged to overhang the rear of said frame with the space beneath the upper portion of said elevator unobstructed, means for hitching said frame to the rear end of a tractor with said elevator trailed directly behind the tractor and free to swing laterally with reference thereto, said means being adapted to counteract the rearwardly overhanging weight of said elevator, said frame including a rigid boom protruding laterally from one side thereof and having means thereon for detachably connecting a hay-receiving vehicle to the same to trail alongside said elevator with freedom of lateral swing and sufficiently to the rear to allow said vehicle to swing to the rear of the frame under the overhang of said elevator on turns, and means including a skidway at the upper end of said elevator for directing hay emerging therefrom laterally onto the vehicle trailed alongside.

3. In a tractor-drawn hay loader, the combination of a wheel supported elevator having means for trailingly hitching it behind a tractor, said elevator including an upwardly and rearwardly inclined chute having a smoothly rising floor bordered at its side edges by upstanding side walls, an endless elevating mechanism for sliding loose hay upward along said floor, such floor merging at its upper end into a generally horizontal floor of a laterally directed elbow of substantially rectangular cross-section, said elbow having side walls forming smoothly and laterally curved continuations of the elevator side walls, and a generally sector shaped section on said elbow, said sector having a bottom wall and a curved upstanding wall telescopingly received on said elbow and pivoted to swing freely about a center substantially coincident with the center of curvature of said elbow side walls.

4. In a tractor-drawn hay loader, the combination of a wheel supported elevator having means for trailingly hitching it behind a tractor, said elevator including an upwardly and rearwardly inclined chute having a smoothly rising floor bordered at its side edges by upstanding side walls, an endless elevating mechanism for sliding loose hay upward along said floor, such floor merging at its upper end into the substantially horizontal bottom wall portion of a generally tubular elbow whose outlet is directed laterally of the upper end of said elevator, a generally tubular extension for said elbow and telescopingly received on the same, and a pivot supporting said extension for free swinging movement between a retracted position in which it is telescoped substantially fully over said elbow and an out-thrust position in which it forms a continuation of the same.

LOREN E. WORSDELL.

REFERENCES CITED

The following references are of record in the file of this patent:

UNITED STATES PATENTS

| Number | Name | Date |
| --- | --- | --- |
| 742,669 | Kailor | Oct. 27, 1903 |
| 916,310 | Henderson | Mar. 23, 1909 |
| 947,018 | Johnson | Jan. 18, 1910 |
| 1,190,417 | Jacobs | July 11, 1916 |
| 1,307,781 | Lawrence | June 24, 1919 |
| 1,385,560 | Lehsou | July 26, 1921 |
| 1,570,256 | Hunt | Jan. 19, 1926 |
| 1,707,725 | Jantz | Apr. 2, 1929 |
| 1,884,399 | Vail | Oct. 25, 1932 |
| 1,919,896 | MacGregor | July 25, 1933 |
| 1,935,987 | Paradise et al. | Nov. 21, 1933 |
| 1,936,603 | Larson | Nov. 28, 1933 |
| 2,174,605 | Spencer, Jr. | Oct. 3, 1939 |
| 2,233,837 | Fuhrhop | Mar. 4, 1941 |
| 2,327,494 | Brown | Aug. 24, 1943 |
| 2,335,924 | Elholm | Dec. 7, 1943 |
| 2,397,570 | Smoker | Apr. 2, 1946 |
| 2,410,238 | Ringrose | Oct. 29, 1946 |